(12) United States Patent
Atassi

(10) Patent No.: US 7,954,328 B2
(45) Date of Patent: Jun. 7, 2011

(54) FLAME HOLDER FOR MINIMIZING COMBUSTOR SCREECH

(75) Inventor: Oliver V. Atassi, Longmeadow, MA (US)

(73) Assignee: United Technologies Corporation, Hartford, CT (US)

( * ) Notice: Subject to any disclaimer, the term of this patent is extended or adjusted under 35 U.S.C. 154(b) by 125 days.

(21) Appl. No.: 12/013,639

(22) Filed: Jan. 14, 2008

(65) Prior Publication Data

US 2009/0178414 A1      Jul. 16, 2009

(51) Int. Cl.
*F02K 3/10*        (2006.01)

(52) U.S. Cl. ............................. 60/761; 60/763; 60/765

(58) Field of Classification Search .............. 60/204, 60/749, 725, 761, 765, 763, 762
See application file for complete search history.

(56) References Cited

U.S. PATENT DOCUMENTS

| | | | |
|---|---|---|---|
| 3,974,646 A * | 8/1976 | Markowski et al. | 60/737 |
| 3,974,647 A * | 8/1976 | Lewis et al. | 60/725 |
| 4,315,401 A | 2/1982 | Beal et al. | |
| 4,802,337 A | 2/1989 | Caruel | |
| 4,989,407 A | 2/1991 | Grant, Jr. | |
| 5,040,560 A * | 8/1991 | Glezer et al. | 137/13 |
| 5,095,696 A | 3/1992 | Gulati et al. | |
| 5,129,226 A * | 7/1992 | Bigelow et al. | 60/765 |
| 5,179,832 A | 1/1993 | Barcza et al. | |
| 5,396,763 A | 3/1995 | Mayer et al. | |
| 5,487,274 A | 1/1996 | Gulati et al. | |
| 5,685,140 A * | 11/1997 | Clements et al. | 60/204 |
| 5,778,658 A * | 7/1998 | Lamando et al. | 60/204 |
| 6,351,941 B1 | 3/2002 | Vossman et al. | |
| 6,464,489 B1 | 10/2002 | Gutmark et al. | |
| 6,752,620 B2 | 6/2004 | Heier et al. | |
| 7,013,635 B2 | 3/2006 | Cohen et al. | |

* cited by examiner

*Primary Examiner* — Michael Cuff
*Assistant Examiner* — Vikansha S Dwivedi
(74) *Attorney, Agent, or Firm* — Carlson, Gaskey & Olds, P.C.

(57) ABSTRACT

A flame holder for an augmentor includes geometry to produce large radial variations in heat release to prevent coupling with modes within the exhaust duct that produce combustor screech. A surface of the flame holder varies axially in a radial direction to produce a radial phase variation in heat released from the flame holder. The radially changing surface produces radially non-uniform and unsteady heat release that does not couple with acoustic modes within the exhaust duct.

20 Claims, 3 Drawing Sheets

FLAME HOLDER FOR MINIMIZING COMBUSTOR SCREECH

BACKGROUND OF THE INVENTION

This invention generally relates to a method and device for reducing combustor screech. More particularly, this invention relates to a flame holder that generates a radial phase variation that weakly couples to natural acoustic modes of the combustor.

Augmentors or "afterburners" provide an increase in thrust generated by a gas turbine engine. Fuel is sprayed into a core stream and ignited to produce the desired additional thrust. The fuel is fed into the core stream upstream of a flame holding device. The flame holding device provides a region of low turbulence to anchor and stabilize the flame within the high flow of the core stream. Combustor screech results when natural modes of the combustor couple with unsteady heat released by a combustion flame. Uniform heat release perturbation across the duct combines with the natural modes to produce the strongest screech. Noise attenuation features in the duct walls can dampen only portions of acoustic energy produces during combustion. Accordingly, it is desirable to develop methods and devices for reducing the generation and propagation of acoustic energy originating from the combustion process.

SUMMARY OF THE INVENTION

An example flame holder for an augmentor includes geometry to produce large radial variations in heat release to prevent coupling with the modes within the exhaust duct that produce combustor screech.

The example flame holder includes a surface that varies axially in a radial direction. The surface varies in axial position over a length between an inner exhaust case and an outer exhaust case. The axial variation of the surface produces a radial phase variation in heat released from the flame holder. The radially changing surface produces radially non-uniform and unsteady heat release of the flame that couples poorly with the acoustic modes of the core gases. This results in an overall reduction in acoustic energy that can produce the undesirable combustor screech.

Accordingly, the example flame holder generates variations in heat release to prevent coupling between convective wavelengths and undesirable acoustic modes to reduce combustor screech.

These and other features of the present invention can be best understood from the following specification and drawings, the following of which is a brief description.

DETAILED DESCRIPTION OF THE PREFERRED EMBODIMENT

Figure 1:
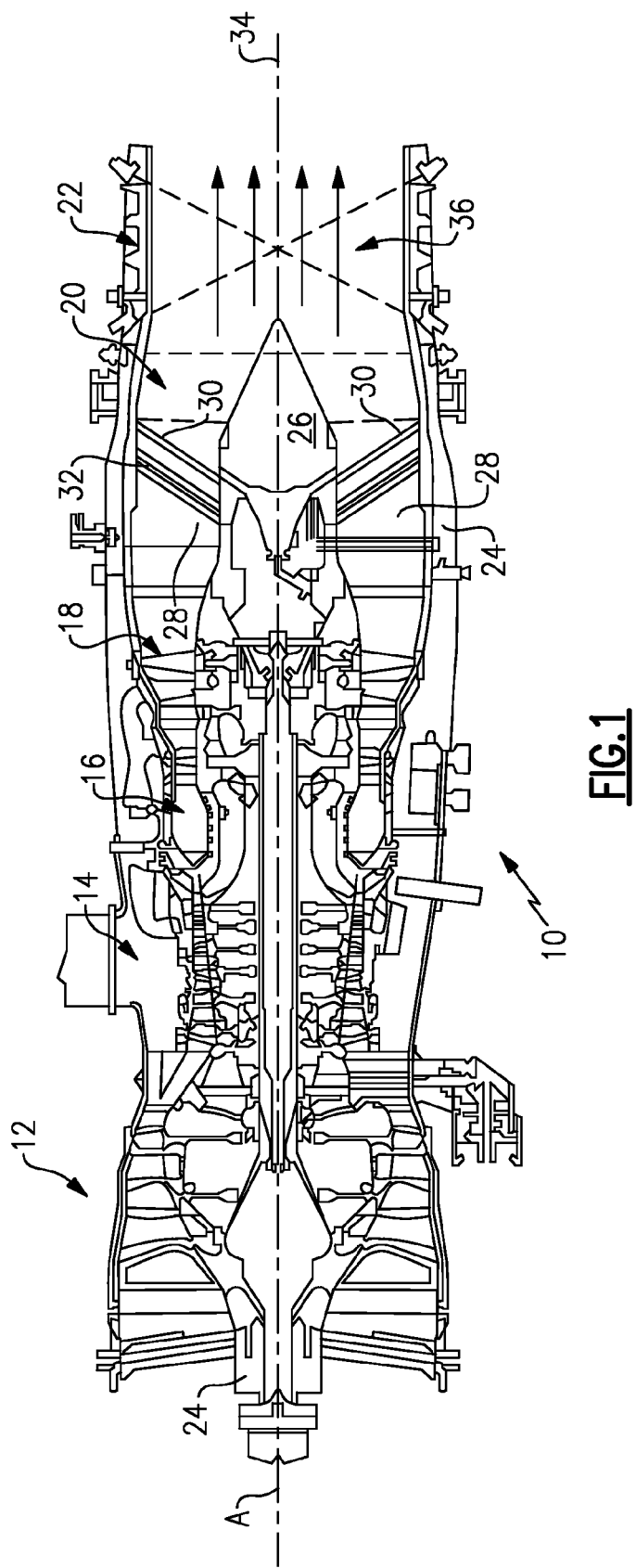
FIG. 1 is a general perspective view of an example gas turbine engine including the present invention.

FIG. 1 schematically illustrates an example gas turbine engine 10 which generally includes a fan section 12, a compressor section 14, a combustor section 16, a turbine section 18, an augmentor section 20 and an exhaust duct 22. The compressor section 14, combustor section 16, and turbine section 18 are generally referred to as the core engine. An axis 34 is centrally disposed and extends longitudinally through the engine 10.

The augmentor section 20 includes an inner turbine exhaust case 26, an outer turbine exhaust case 24 and a plurality of turbine exhaust case vanes 28 extending radially therebetween. Each of the turbine exhaust case vanes 28 supports a fuel spray bar 32 and a flame holder 30. Fuel emitted from the fuel spray bar 32 is mixed with the core gas flow 36 and ignited by a flame anchored to the turbine exhaust case vanes 28 within the flame holder 30.

Combustor screech is generated by natural modes of core gas flows 36 through the exhaust duct 22. The frequency at which screech occurs is low such that only a few modes propagate through the duct. The magnitude at which a mode propagates through the exhaust duct 22 can be amplified by radially uniform release of heat from the flame holder 30. The radially uniform release of heat generated from a flame holder couples with the natural modes within the core gases to undesirably increase mode strength, thereby increasing acoustic energy and combustor screech.

Figure 2A:
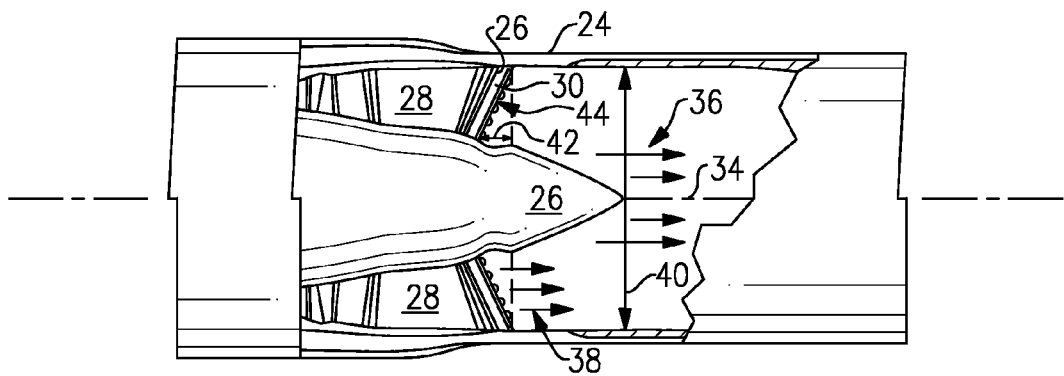
FIG. 2A is perspective view of a turbine exhaust case including an example flame holder.
Figure 2B:
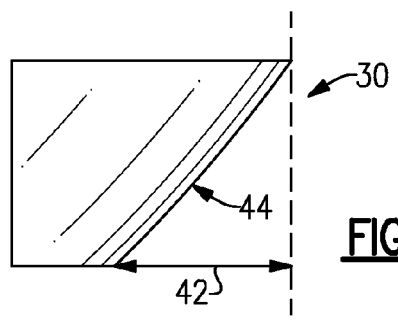
FIG. 2B is a schematic view of a portion of the example flame holder of FIG. 2A.

Referring to FIGS. 2A-2B, the example flame holder 30 includes geometry to produce large radial variations in heat release from the flame holder 30 to prevent coupling with the strongest modes within the exhaust duct 22. The flame holder 30 includes a surface 44 that varies axially in a radial direction indicated by arrows 40. The surface of the example flame holder 30 varies in axial position a length 42 between the inner exhaust case 26 and the outer exhaust case 24. The axial variation of the surface 44 produces a radial phase variation in heat released from the flame holder 30. The radially changing surface 44 produces radially non-uniform and unsteady heat release of the flame that couples poorly with the acoustic modes of the core gases 36. This results in an overall reduction in acoustic energy that can produce the undesirable combustor screech.

The length 42 is determined to prevent the generation of unsteady heat release at a frequency that would couple with the most prevalent acoustic modes. The radial variation of the surface 44 is determined as a function of the mean velocity of the core gas flow and the minimum frequency at which the combustor screech is expected. The relationship can be represented by the equation:

$$L = U/f$$

Where L=axial length of radial variation.
U is the mean velocity of the core flow.
f is the minimum frequency at which screech is expected.
The example surface 44 varies the axial length 42 over the radial distance between the inner exhaust case 26 and the outer case 24. The axial variation produces the desired radial variations in heat release schematically indicated at 38. The radial variation in heat release 38 prevents the coupling between convective wavelengths generated by the heat release and the frequency modes of the core gases 36.

Figure 3A:
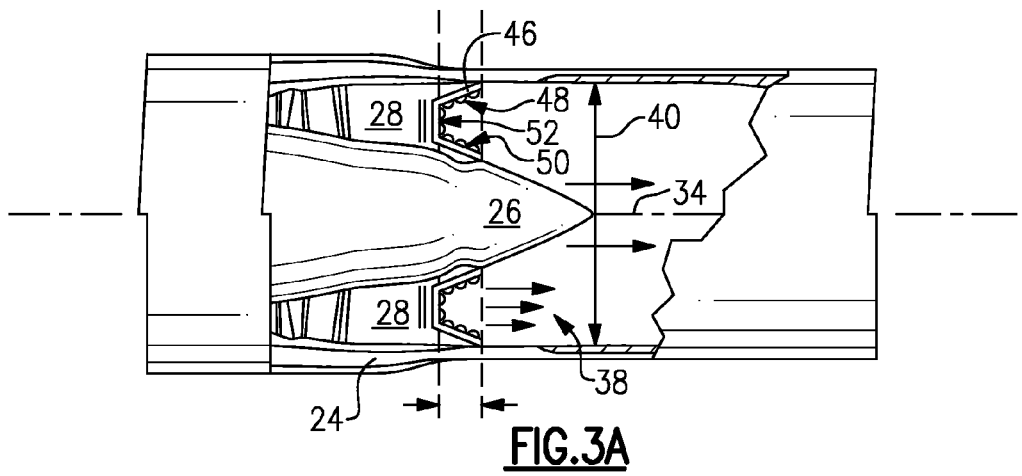
FIG. 3A is another perspective view of a turbine exhaust case including another example flame holder.
Figure 3B:
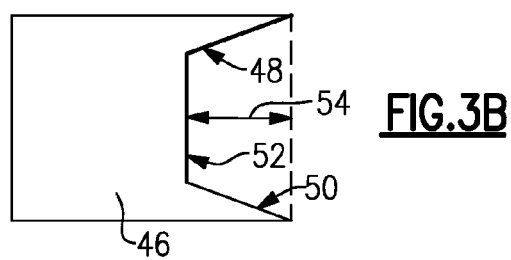
FIG. 3B is a schematic view of a portion of the example flame holder of FIG. 3A.

Referring to FIGS. 3A and 3B, another example flame holder 46 comprises surfaces 48, 50 and 52 that vary axially in the radial direction between the inner exhaust case 26 and the outer exhaust case 24 to produce the desired variations in heat release. The surfaces 48, 50 and 52 vary axially over a length 54. The length 54 is ½ the length indicated by the example formula above, but includes two surfaces that vary axially in opposing directions to provide the desired complete axially varied surface. Instead of including one surface that varies the entire desired length, two surfaces are utilized that each vary axially in a radial direction ½ the desired axially varied length to reduce and/or eliminate coupling with the undesirable acoustic modes.

The example flame holder 46 includes the first axially varying surface 48 that angles upstream away from the exhaust duct 22 in a radial direction from the outer exhaust case 24. The second axially varying surface 50 is also angled upstream away as the surface extends from the outer exhaust case toward the inner exhaust case 26. In other words, the distal edges of the first surface 48 and the second surface 50 are at a common axial location, with the inner edges disposed upstream ½ a convective wavelength. The convective wavelength is comparable to the frequency in the above equation with which it is desired to prevent coupling of a convective wavelength generated by the heat release from the surface of the flame holder 46.

Between the first and second axially varying surfaces 48, 50 is an axially constant surface that connects the first and second surfaces radially. The center surface 52 does not vary axially in a radial direction. The axially varying first and second surfaces 48, 50 generate radial variations in heat release of the flame holder 46 that disrupt potential coupling with the frequency at which combustor screech is expected.

Figure 4A:
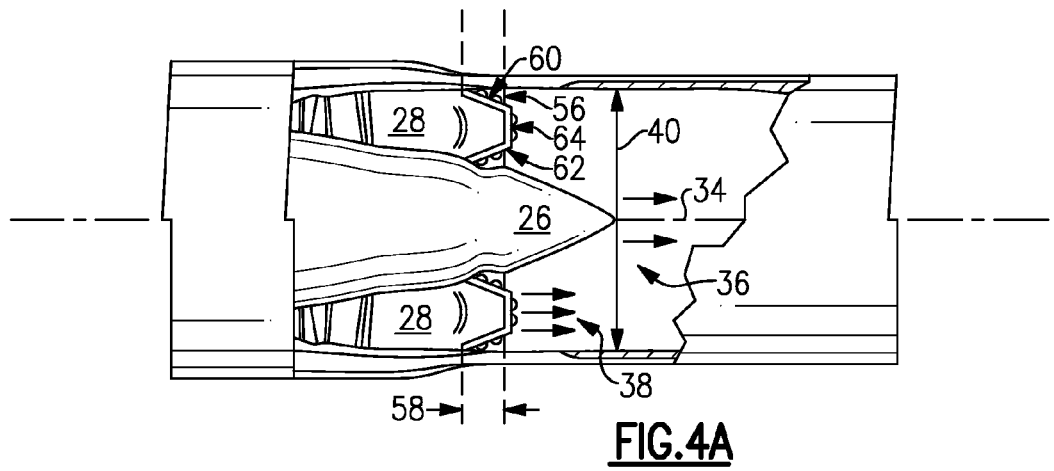
FIG. 4A is another perspective view of another turbine exhaust case including another example flame holder.
Figure 4B:
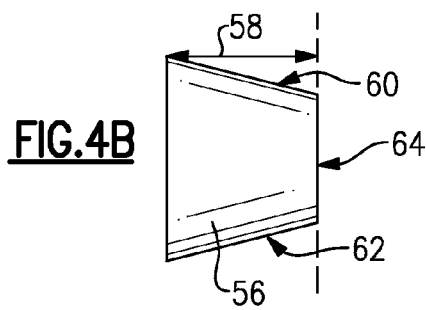
FIG. 4B is a schematic view of a portion of the example flame holder of FIG. 4A.

Referring to FIGS. 4A and 4B, another example flame holder 56 includes first and second surfaces 60 and 62 that vary radially in the axial direction aft of the engine 10. The first surface 60 extends aft and toward the inner exhaust case in an axially rearward direction. The second surface 62 extends aft and radially away from the inner exhaust case 26. A third surface 64 is axially constant in the radial direction. Therefore, the example flame holder 56 includes an outer edge of the first surface 60 at the outer exhaust case 24 that is at a common axial location with an inner edge of the second surface 62 at the inner exhaust case 26 with a midpoint of the flame holder being ½ a convective wavelength aft of the inner the edges of the first and second surfaces 60, 62.

Between the first and second surfaces 60, 62 and aft of the edges adjacent the inner and outer case 26, 24 is a third surface 64 that is axially constant in the radial direction. The heat release generated by the example flame holder 56 produces the desired radial phase variation such that the convective wavelength is out of phase with prevalent acoustic modes within the core gas flow 36. As is shown the axial length 58 over which the flame holder surface varies in radial position axially can be divided such that the combined lengths equal the length determined by the above relationship between core gas velocity and the frequency that produces the undesired acoustic modes.

Figure 5A:
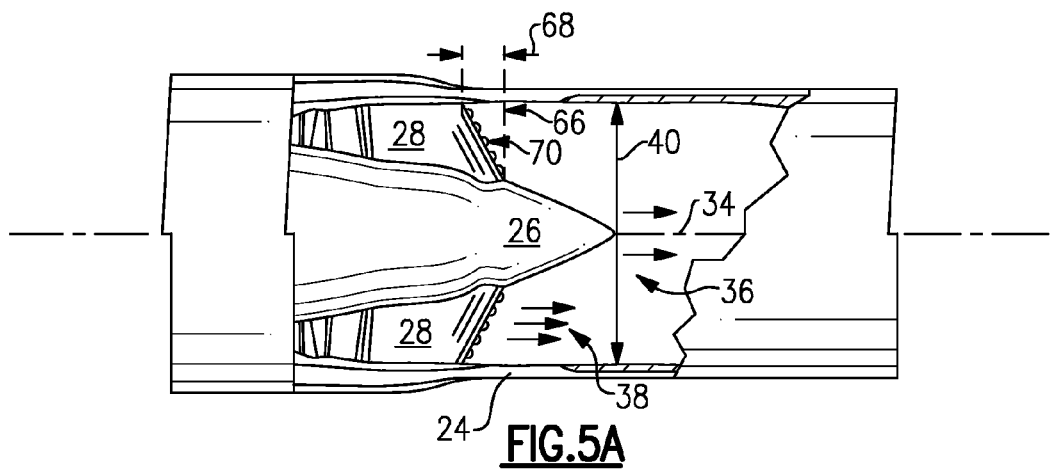
FIG. 5A is another perspective view of a turbine exhaust case including another example flame holder.
Figure 5B:
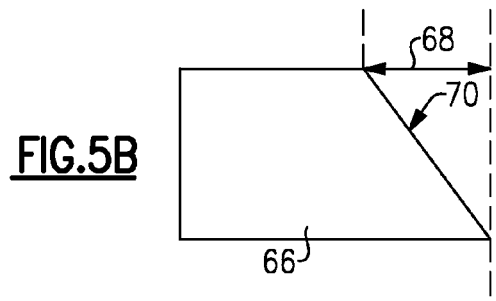
FIG. 5B is another schematic view of a portion of the example flame holder of FIG. 5A.

Referring to FIGS. 5A and 5B, another example flame holder 66 includes a surface 70 that includes one edge at the outer case 24 that is disposed aft of a second edge disposed at the inner exhaust case 26. The surface 70 varies in axial position in the radial direction at a constant angle for the length 68. The length 68 corresponds with the relationship between core gas flow velocity and frequency to produce phase variations that do not couple with undesired frequencies that produce combustor screech.

The length 68 determines the angle of the surface 70 so that the axial variation in the radial direction provides the desired length 68. As appreciated, the angle can vary with application specific requirements. In some instances where larger lengths 68 are required as determined by application conditions including core gas flow velocities, the angle at which the surface 70 sweeps upstream will be smaller to accommodate the desired increase length of the surface 70. In other application where shorter lengths 68 are required, the angle will be more acute.

Accordingly, the disclosed example flame holders generate variations in heat release to prevent coupling between convective wavelengths and undesirable acoustic modes to reduce combustor screech.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A flame holder assembly comprising:
   a first end;
   a second end spaced radially apart from the first end;
   a flame holder mounted to an exhaust case vane that extends between an inner exhaust case and an outer exhaust case, the flame holder mounted to a first surface of the exhaust case vane angled in a first direction from the outer exhaust case toward the inner exhaust case and a second surface of the exhaust case vane angled in a second direction opposite the first direction from the inner exhaust case toward the outer exhaust case, the flame holder generating a radial variation in heat generated aft of the flame holder surface.

2. The assembly as recited in claim 1, wherein the flame holder surface varies an axial distance over a radial length between the inner exhaust case and the outer exhaust case equal to a relationship between core flow velocity and a desired frequency.

3. The assembly as recited in claim 1, wherein the flame holder surface varies an axial distance over the radial length equal to the relationship:

$$L = U/f$$

Where:
   L=total combined axial distance
   U=velocity of the core flow gases
   f=minimum frequency desired to be mitigated.

4. The assembly as recited in claim 1, wherein the first surface extends in a first axial direction transverse to longitudinal axis of the inner exhaust case and the outer exhaust case and the second surface extends in a second axial direction different than the first axial direction transverse to the longitudinal axis.

5. The assembly as recited in claim 1, wherein the first surface includes a first segment disposed at a first angle relative to the core gas flow and a second segment disposed at a second angle opposite the first angle.

6. The assembly as recited in claim 5, including a middle segment disposed between the first and second segments, the middle segment disposed substantially perpendicular to the turbine exhaust inner and outer case.

7. The assembly as recited in claim 1, including a fuel spray bar mounted to the first and second surfaces of the exhaust case vane such that the fuel spray bar is disposed at an angle corresponding to the angle of the first and second surfaces of the exhaust case vane.

8. The assembly as recited in claim 7, wherein the fuel spray bar is mounted to an upstream of the flame holder.

9. A flame holder assembly comprising:
a first end;
a second end spaced radially apart from the first end; and
a flame holder extending between an inner exhaust case and an outer exhaust case, the flame holder including a first surface angled in a first direction from the outer exhaust case toward the inner exhaust case and a second surface angled in a second direction opposite the first direction from the inner exhaust case toward the outer exhaust case, the flame holder generating a radial variation in heat generated aft of the flame holder surface, wherein the first surface extends in a first axial direction transverse to longitudinal axis of the inner exhaust case and the outer exhaust case and the second surface extends in a second axial direction different than the first axial direction transverse to the longitudinal axis; and
a third surface is disposed between the first and second surfaces.

10. The assembly as recited in claim 9, wherein the first and second surfaces extend aft of the third surface.

11. The assembly as recited in claim 9, wherein the first and second surfaces extend forward of the third surface.

12. An augmentor section comprising:
a turbine exhaust inner case;
a turbine exhaust outer case:
a plurality of turbine exhaust case vanes extending radially between the turbine exhaust inner case and the turbine exhaust outer case; and
a plurality of flame holders mounted to a corresponding one of the plurality of turbine exhaust case vanes, each of the plurality of flame holders including a first surface, and a second surface that vary axially in a radial direction between the inner case and the outer case, wherein the first surface angles in a first direction away from the inner case and the second surface angles in a second direction opposite the first direction from the outer case.

13. The section as recited in claim 12, wherein the axial distance comprises a length substantially equal to a relationship between core flow velocity and a desired frequency.

14. The assembly as recited in claim 12, wherein the axial distance varies over the radial length equal to the relationship:

$$L=U/f$$

Where:
L=total combined axial distance
U=velocity of the core flow gases
f=minimum frequency desired to be mitigated.

15. The assembly as recited in claim 12, wherein the first surface includes a first angled segment extending at a first angle relative to a surface of the turbine exhaust outer case and a second angled segment extending at a second angle opposite the first angle.

16. The assembly as recited in claim 12, including a fuel spray bar mounted to the exhaust case vane, the fuel spray bar disposed at an angle corresponding to the angle of the first and second surfaces of the flame holder.

17. The assembly as recited in claim 16, wherein the fuel spray bar is mounted to an upstream of the flame holder.

18. An augmentor section comprising:
a turbine exhaust inner case;
a turbine exhaust outer case:
a plurality of turbine exhaust case vanes extending radially between the turbine exhaust inner case and the turbine exhaust outer case;
a plurality of flame holders mounted to a corresponding one of the plurality of turbine exhaust case vanes, each of the plurality of flame holders including a first surface, and a second surface that vary axially in a radial direction between the inner case and the outer case, wherein the first surface angles in a first direction away from the inner case and the second surface angles in a second direction opposite the first direction from the outer case; and
a third surface disposed between first and second surfaces, the third surface disposed transverse to a longitudinal axis of the augmentor.

19. The assembly as recited in claim 18, wherein both of the first and second surfaces extend aft of the third surface.

20. The assembly as recited in claim 18, wherein both of the first and second surfaces extend forward of the third surface.

* * * * *